(12) United States Patent
Sun et al.

(10) Patent No.: US 8,800,274 B2
(45) Date of Patent: Aug. 12, 2014

(54) METHOD FOR MANAGING AMMONIA SLIP

(75) Inventors: Min Sun, Troy, MI (US); Jean-Yves Lavallee, Farmington Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 399 days.

(21) Appl. No.: 13/106,115

(22) Filed: May 12, 2011

(65) Prior Publication Data

US 2012/0285143 A1    Nov. 15, 2012

(51) Int. Cl.
   *F01N 3/10*  (2006.01)

(52) U.S. Cl.
   USPC ............ 60/301; 60/274; 60/278; 60/286; 60/297

(58) Field of Classification Search
   USPC ............ 60/274, 278, 286, 297, 301, 303
   See application file for complete search history.

(56) References Cited

U.S. PATENT DOCUMENTS

| | | | | |
|---|---|---|---|---|
| 6,755,014 B2* | 6/2004 | Kawai et al. | | 60/286 |
| 6,928,359 B2* | 8/2005 | Xu et al. | | 701/102 |
| 7,685,810 B2* | 3/2010 | Hirata et al. | | 60/277 |
| 8,096,110 B2* | 1/2012 | Solbrig | | 60/286 |
| 8,109,079 B2* | 2/2012 | Wills et al. | | 60/286 |
| 8,375,700 B2* | 2/2013 | Sisken et al. | | 60/277 |
| 2008/0060348 A1 | 3/2008 | Robel et al. | | |
| 2010/0043402 A1 | 2/2010 | Perry et al. | | |
| 2010/0107605 A1 | 5/2010 | Brinkman et al. | | |
| 2010/0107609 A1 | 5/2010 | Parmentier et al. | | |
| 2011/0072798 A1* | 3/2011 | Herman | | 60/286 |

* cited by examiner

*Primary Examiner* — Binh Q Tran

(57) ABSTRACT

An internal combustion engine is configured to operate in a compression-ignition combustion mode and includes an exhaust aftertreatment system having an ammonia-selective catalytic reduction device. A method for operating the engine includes determining a present engine NOx generation rate, determining a NOx reduction rate of the ammonia-selective catalytic reduction device, determining an ammonia slip rate from the ammonia-selective catalytic reduction device corresponding to the NOx reduction rate of the ammonia-selective catalytic reduction device and the present engine NOx generation rate, and controlling engine operation to adjust the present engine NOx generation rate in response to the ammonia slip rate from the ammonia-selective catalytic reduction device.

9 Claims, 2 Drawing Sheets

METHOD FOR MANAGING AMMONIA SLIP

TECHNICAL FIELD

This disclosure is related to managing exhaust gas constituents in exhaust aftertreatment systems of internal combustion engines.

BACKGROUND

The statements in this section merely provide background information related to the present disclosure, and accordingly such statements are not intended to constitute an admission of prior art.

Known internal combustion engines that are configured to operate lean of stoichiometry may be equipped with exhaust aftertreatment systems including three-way catalytic converters and ammonia-selective catalytic reduction (NH3-SCR) devices having catalysts to treat constituents in an exhaust gas feedstream. Such known systems generate and store ammonia on a catalytic surfaces in the NH3-SCR device that is employed to react with exhaust gases. Ammonia may be generated by passing a rich exhaust gas feedstream through a three-way catalytic converter upstream of an NH3-SCR device under specific engine operating conditions. The stored ammonia reduces nitrogen oxide (NOx) molecules in the exhaust gas feedstream to elemental nitrogen and water under a range of operating conditions associated with exhaust temperature and flowrate. Stored ammonia may separate from the catalyst in the NH3-SCR device and pass into the exhaust gas feedstream under specific operating conditions, such during engine acceleration. This is referred as ammonia slip.

A known method to prevent ammonia slip, i.e., expulsion of stored ammonia into the atmosphere, includes using a second oxidation catalyst downstream of the NH3-SCR device. Use of the second oxidation catalyst increases flow restriction in the exhaust gas feedstream, thus reducing maximum engine power and brake-specific fuel consumption. Additionally, use of the second oxidation catalyst increases vehicle mass and adds complexity to the exhaust aftertreatment system.

SUMMARY

An internal combustion engine is configured to operate in a compression-ignition combustion mode and includes an exhaust aftertreatment system having an ammonia-selective catalytic reduction device. A method for operating the engine includes determining a present engine NOx generation rate, determining a NOx reduction rate of the ammonia-selective catalytic reduction device, determining an ammonia slip rate from the ammonia-selective catalytic reduction device corresponding to the NOx reduction rate of the ammonia-selective catalytic reduction device and the present engine NOx generation rate, and controlling engine operation to adjust the present engine NOx generation rate in response to the ammonia slip rate from the ammonia-selective catalytic reduction device.

BRIEF DESCRIPTION OF THE DRAWINGS

One or more embodiments will now be described, by way of example, with reference to the accompanying drawings, in which.

DETAILED DESCRIPTION

Figure 1:
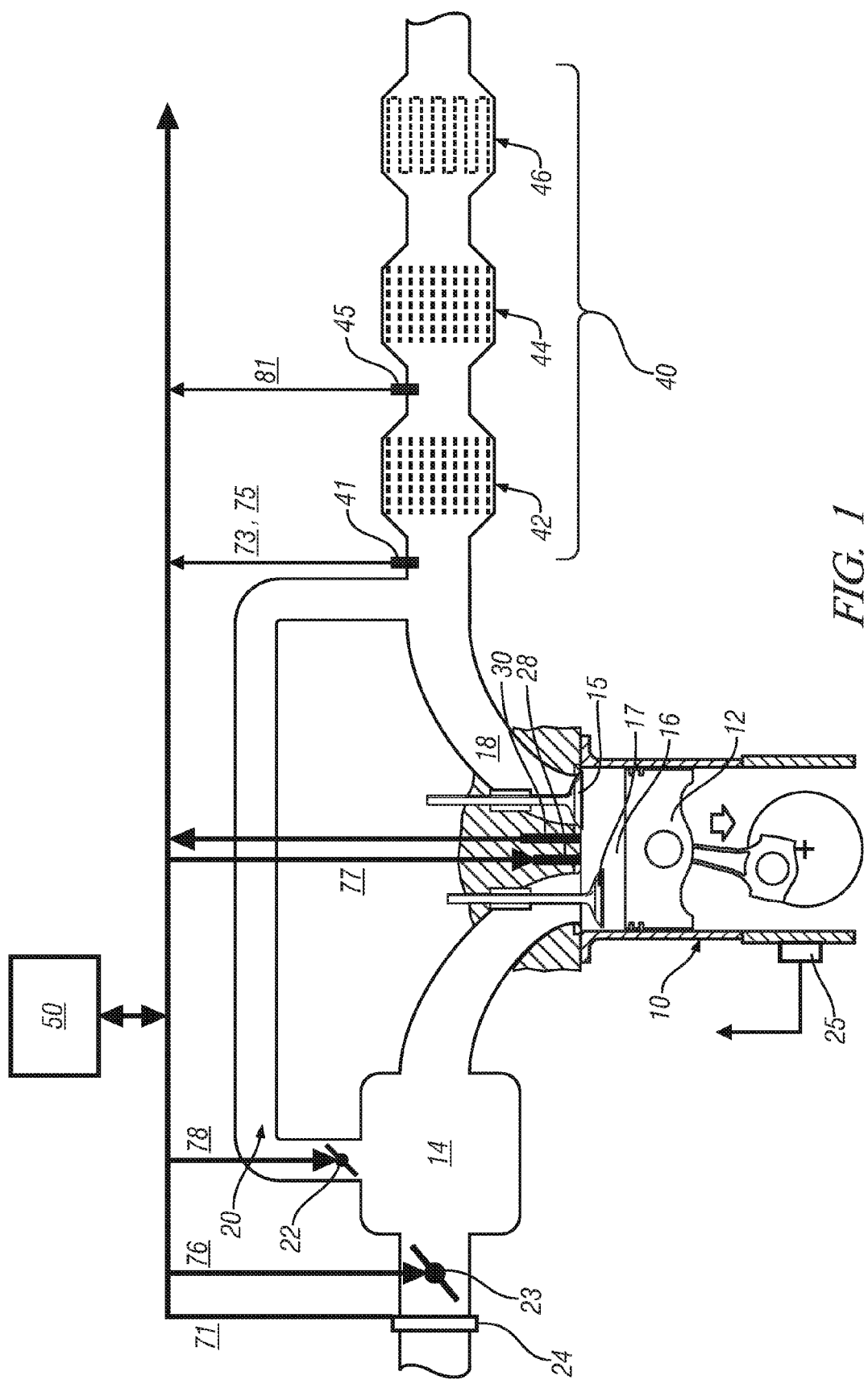
FIG. 1 schematically illustrates a portion of a single cylinder of a compression-ignition internal combustion engine and an exhaust aftertreatment system in accordance with the disclosure.

Referring now to the drawings, wherein the showings are for the purpose of illustrating certain exemplary embodiments only and not for the purpose of limiting the same, FIG. 1 schematically illustrates a portion of a single cylinder 12 of a compression-ignition internal combustion engine 10 fluidly coupled to an attached exhaust aftertreatment system 40. The exhaust aftertreatment system 40 is configured as a passive NH3-SCR system that includes a three-way catalytic converter 42 fluidly coupled to and upstream of an ammonia-selective catalytic reduction (NH3-SCR) device 44.

The internal combustion engine 10 is configured to operate in a four-stroke combustion cycle including repetitively executed intake-compression-ignition-exhaust strokes, or any other suitable combustion cycle. The internal combustion engine 10 preferably includes an intake manifold 14, combustion chamber 16, intake and exhaust valves 17 and 15, respectively, an exhaust manifold 18, and an EGR system 20 including an EGR valve 22. The intake manifold 14 preferably includes a mass airflow sensing device 24 that generates a signal output 71 corresponding to a mass flowrate of engine intake air. The intake manifold 14 optionally includes a throttle device 23. An air/fuel ratio sensing device 41 is configured to monitor an exhaust gas feedstream of the internal combustion engine 10, and preferably generates signal outputs including an air/fuel ratio signal 75 and an exhaust gas feedstream temperature signal 73. A fuel injector 28 is configured to directly inject a fuel pulse into the combustion chamber 16 in response to a pulsewidth command 77. In the illustrated embodiment, one or more pressure sensor(s) 30 is configured to monitor in-cylinder pressure in one of, or preferably all of the cylinders of the engine 10 during each combustion cycle. A rotational position sensor 25 is configured to monitor rotational position and speed of a crankshaft of the engine 10. A single one of the cylinders 12 is depicted in FIG. 1, but it will be appreciated that the engine 10 will typically include a plurality of cylinders each having an associated combustion chamber 16, fuel injector 28, and intake and exhaust valves 17 and 15. The description of the engine 10 is illustrative, and the concepts described herein are not limited thereto. Although the internal combustion engine 10 is described as a compression-ignition internal combustion engine, it will be appreciated that the concepts described herein apply to other internal combustion engines configured to operate lean of stoichiometry that are fluidly coupled to an exhaust aftertreatment system that includes a passive NH3-SCR device.

The exhaust manifold 18 captures the exhaust gas feedstream of the internal combustion engine 10, and channels it to the exhaust aftertreatment system 40. The exhaust aftertreatment system 40 includes the three-way catalytic converter 42, which is fluidly coupled to and upstream of the aforementioned NH3-SCR device 44 in the shown embodiment Ammonia may be generated in the three-way catalytic converter 42 by periodically modulating operation of the internal combustion engine 10 to generate an exhaust gas feedstream that includes nitric oxide (NO), carbon monoxide (CO), and hydrogen ($H_2$). As will be appreciated by one having ordinary skill in the art, these constitutes in the exhaust gas feedstream will produce ammonia in the three-way catalytic converter 42 under specific engine operating condition. Such engine operating conditions include a rich air/fuel ratio (AFR) excursion, during which, the three-way catalytic converter 42 converts rich exhaust gas to constituents CO, H2O, and ammonia (NH3).

The three-way catalytic converter 42 includes a ceramic or metallic substrate element that is coated with one or more catalytically active materials for oxidizing hydrocarbons in the exhaust gas feedstream. The three-way catalytic converter 42 may be embodied in a device that is capable of oxidizing HC and CO molecules, and reducing NOx molecules in response to engine operating conditions including air/fuel ratio.

Figure 3:
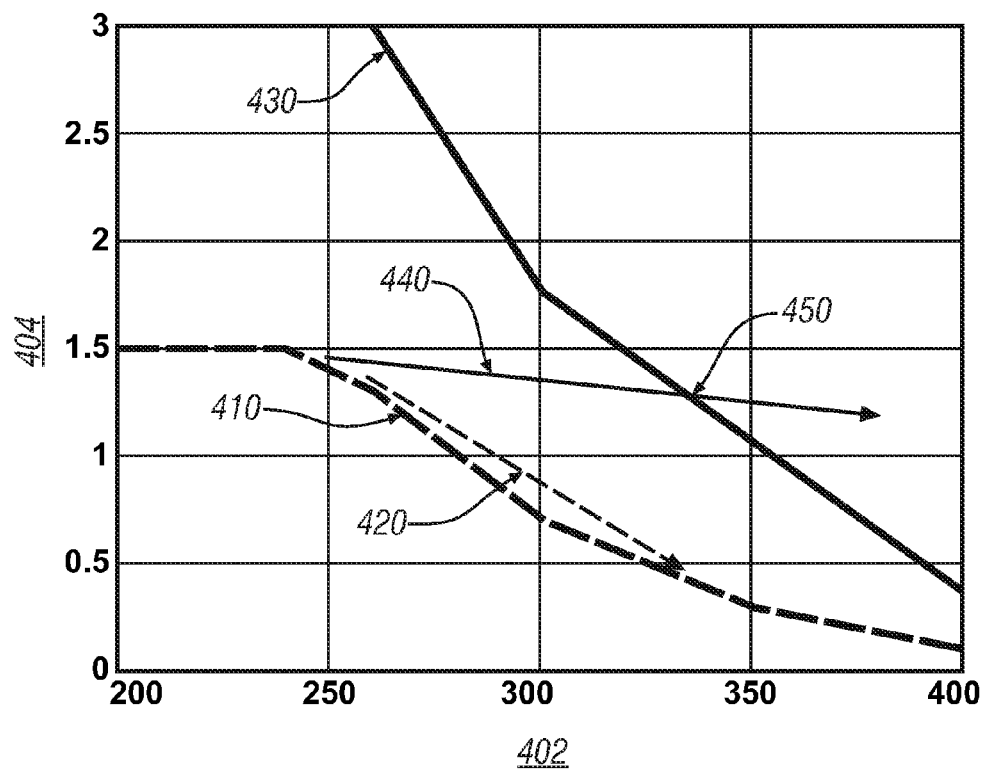
FIG. 3 graphically shows NH3 storage capacity for an NH3-SCR device as a function of NH-3-SCR inlet temperature in accordance with the disclosure.

The NH3-SCR device 44 includes one or more substrate elements preferably fabricated from cordierite material having a multiplicity of flow through passageways that are preferably coated with a zeolite washcoat and catalytic material, e.g., a catalytically active base metal. The catalytically active materials store ammonia, and release stored ammonia for reacting with NOx molecules in the exhaust gas feedstream. It will be appreciated that the storage capacity of a NH3-SCR device 44, i.e., the amount of NH3 that may be stored on the NH3-SCR catalyst, correlates to an exhaust gas inlet temperature of the NH3-SCR device 44. An air/fuel ratio sensing device 45 is configured to monitor the exhaust gas feedstream at the inlet of NH3-SCR device 44 and preferably generates a signal output including an exhaust gas temperature signal 81. When the inlet temperature increases above a threshold temperature, the NH3 storage capacity decreases. This relationship is shown in FIG. 3, and will be discussed further in the disclosure related thereto.

In the embodiment shown in FIG. 1, the exhaust aftertreatment system 40 also optionally includes a particulate filter 46 that is inserted in the exhaust gas feedstream downstream of the NH3-SCR device 44. The particulate filter 46 includes a ceramic filter element, e.g., a wall-flow element configured to trap particulate matter.

A control module 50 is signally connected to the air/fuel ratio sensing device 41, the mass airflow sensing device 24, and the pressure sensor(s) 30. The control module 50 is also operatively connected to the fuel injector 28, the throttle device 23, and the EGR valve 22. The control module 50 is configured to execute control schemes to control operation of the engine 10 to form the cylinder charge in response to an operator command.

The control module 50 operates the fuel injector 28 by providing pulsewidth command 77 to deliver a fuel pulse to the combustion chamber 16. The pulsewidth command 77 represents an elapsed time period during which the fuel injector 28 is opened and delivering the fuel pulse. The delivered fuel pulse interacts with intake air and any internally retained and externally recirculated exhaust gases to form a cylinder charge in the combustion chamber 16 in response to an operator torque request. It will be appreciated that the control module 50 may command multiple fuel injection events using corresponding multiple pulsewidth commands 77 in causing the fuel injector 28 to deliver the fuel to the combustion chamber 16 during each cylinder event.

The control module 50 operates the EGR valve 22 by providing an EGR valve opening command 78 to cause the EGR valve 22 to operate at a preferred EGR flowrate to achieve a preferred EGR fraction in the cylinder charge. It will be appreciated that age, calibration, contamination and other factors may affect operation of the EGR system 20, thus causing variations in in-cylinder air/fuel ratio of the cylinder charge. The control module 50 operates the throttle device 23 by providing a throttle valve opening command 76 to command a preferred fresh air mass flowrate for the cylinder charge. In an alternative embodiment, where engine 10 includes a turbocharger device, the control module 50 may operate the turbocharger device to command a preferred boost pressure associated with the cylinder charge.

It will be understood that control module, module, controller, control unit, processor and similar terms used in the disclosure mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinatorial logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

Figure 2:
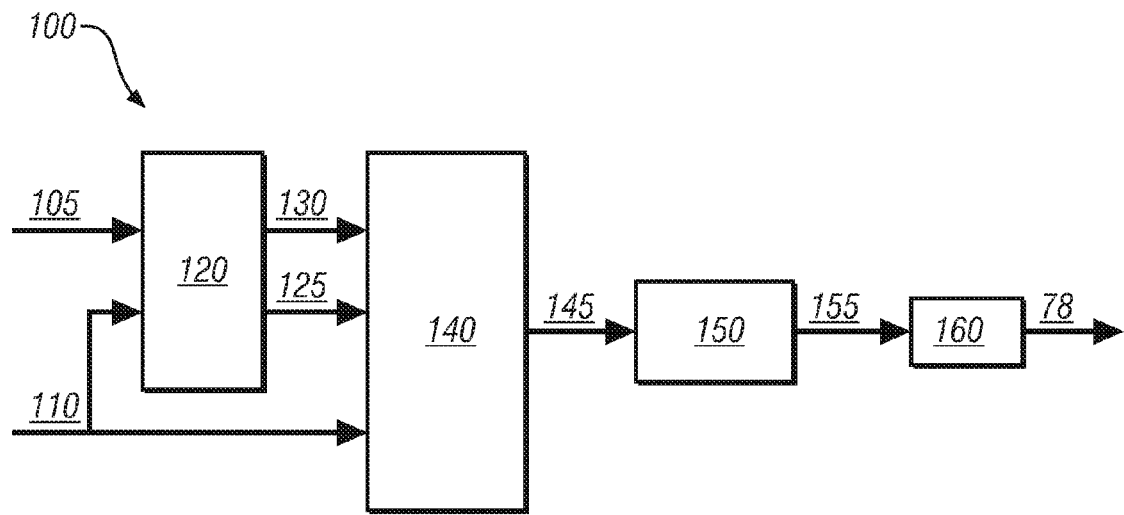
FIG. 2 schematically shows a control scheme for determining a preferred EGR control command in accordance with the disclosure.

FIG. 2 schematically illustrates an embodiment of an engine NOx control scheme 100 for monitoring and operating an internal combustion engine fluidly coupled to an exhaust aftertreatment system 40 that includes a passive NH3-SCR system, e.g., the passive NH3-SCR system including the ammonia-selective catalytic reduction device 44 described herein. The engine NOx control scheme 100 is described with reference to the internal combustion engine 10 depicted in FIG. 1. It will be appreciated that the concepts described herein may be applied to other internal combustion engine systems that employ an ammonia-selective catalytic reduction device 44 as part of an exhaust aftertreatment system for treating NOx emissions in an exhaust gas feedstream.

Overall, the engine NOx control scheme 100 includes monitoring engine operating parameters (105) associated with generating exhaust gas constituents. A present NOx generation rate of the engine (110) corresponding to the monitored engine operating parameters (105) associated with generating exhaust gas constituents is determined. The present NOx generation rate (110) of the engine 10 and the monitored engine operating parameters (105) associated with generating exhaust gas constituents are used to determine a NOx reduction rate (125) of the ammonia-selective catalytic reduction device, and to determine a rate of ammonia slip (130) output from the ammonia-selective catalytic reduction device 44 based upon a difference between the NOx reduction rate (125) thereof and the present NOx generation rate (110) of the engine 10. A preferred NOx generation rate (145) output from the engine 10 that is necessary to consume the rate of ammonia slip (130) output from the ammonia-selective catalytic reduction device 44 is determined. Operation of the engine 10 is controlled to adjust the present NOx generation rate (110) in response to the rate of ammonia slip (130). The engine NOx control scheme 100 will now be described in detail with reference to the exemplary engine 10 and aftertreatment system 40 of FIG. 1.

A plurality of signal and control parameters for the internal combustion engine 10, the exhaust aftertreatment system 40, and the exhaust gas feedstream are monitored or otherwise determined to determine states of input parameters for the engine NOx control scheme 100. As used herein, the term 'state' refers to a magnitude of an associated parameter. This includes monitoring engine operating and control parameters related to generating exhaust gas constituents (105) that may be oxidized, reduced, filtered, and otherwise treated in the exhaust aftertreatment system 40. This preferably includes monitoring signal outputs of the aforementioned engine sensors and monitoring the engine fueling rate associated with the injector pulsewidth command 77 to determine engine speed and load. This also includes monitoring the commanded EGR valve opening command 78, and monitoring signal outputs of the aforementioned exhaust gas sensors to determine exhaust gas characteristics including temperature, air/fuel ratio, and exhaust gas constituents.

The monitored engine operating parameters (105) associated with generating exhaust gas constituents include the engine speed and load. Additionally, the monitored engine operating parameters (105) typically include the signal outputs of the aforementioned exhaust gas sensors configured to monitor exhaust gas parameters including temperature, air/fuel ratio, and exhaust gas constituents. As will be appreciated by those having ordinary skill in the art, the monitored engine operating parameters (105) can be used to determine the present NOx generation rate (110) of the engine 10 in the exhaust gas feedstream.

The present NOx generation rate (110) of the engine 10 and the engine operating parameters (105) associated with generating exhaust gas constituents are input to a real-time SCR simulation model 120 of the NH3-SCR device 44. The real-time SCR simulation model 120 of the NH3-SCR device 44 is preferably executed in the control module 50. In one embodiment, the real-time SCR simulation model 120 of the NH3-SCR device 44 is configured to use the monitored information related to the engine operation and the NH3-SCR device 44 to determine an amount of ammonia that is adsorbed, an amount of ammonia that is desorbed, an amount of ammonia that is oxidized, and an amount of ammonia that is consumed in the NH3-SCR device 44 during ongoing engine operation including during reduction of NOx in the exhaust gas feedstream. The amounts of ammonia that are adsorbed, desorbed, oxidized, and consumed during reduction of NOx may be in any suitable units of measure, including, e.g., mass, volume, or moles. The output of the real-time SCR simulation model 120 of the NH3-SCR device 44 includes the NOx reduction rate (125) of the ammonia-selective catalytic reduction device, preferably expressed as a NOx reduction efficiency value. The output of the real-time simulation 120 of the NH3-SCR device 44 also includes the rate of ammonia slip (130) output from the NH3-SCR device 44. The rate of ammonia slip (130) output from the NH3-SCR device 44 (130) can be determined by any suitable method, including, e.g., employing a sensing device to directly monitor the rate of ammonia slip (130) output from the NH3-SCR device 44.

A calculation module 140 combines the present NOx generation rate (110) of the engine 10, the NOx reduction rate (125) of the NH3-SCR device 44, and the rate of ammonia slip (130) output from the NH3-SCR device 44 to determine a preferred NOx generation rate (145) output from the engine 10. This preferred NOx generation rate (145) is a NOx generation rate that consumes a sufficient amount of ammonia in the NH3-SCR device 44 to prevent ammonia slip from the NH3-SCR device 44. Details associated with operation of the calculation module 140 are described with reference to FIG. 3.

An inverse engine NOx generation model 150 uses the preferred NOx generation rate (145) that is necessary to consume ammonia in the NH3-SCR device 44 at the rate of ammonia slip (130) presently being output from the NH3-SCR device 44 to determine a preferred EGR fraction (155), preferably for each cylinder charge in each engine cycle.

An EGR controller 160 generates the EGR valve opening command 78 that is used to control operation of the EGR valve 22 to achieve the preferred EGR fraction (155). This includes decreasing the EGR valve opening command 78 to decrease the flowrate of externally recirculated exhaust gas to increase the engine NOx generation rate when the ammonia slip rate (130) output from the ammonia-selective catalytic reduction device exceeds a threshold. This control also includes increasing the EGR valve opening command 78 to increase the flowrate of externally recirculated exhaust gas to decrease the engine NOx generation rate. As will be appreciated, the inverse engine NOx generation model 150 preferably uses present states of engine parameters including engine speed, load, mass air flowrate, fueling rate, and intake air temperature to determine a present engine operating state. The inverse engine NOx generation model 150 calculates the preferred EGR flowrate to achieve the preferred EGR fraction (155) in the cylinder charge that achieves the preferred NOx generation rate (145) output from the engine 10 at the present engine operating state. Alternatively, or in addition, states of other operating parameters of the engine 10 are adjusted to adjust the engine NOx generation rate (145) in response to the rate of ammonia slip (130) output from the ammonia-selective catalytic reduction device 44. For example, the operating parameters of the engine 10 can be adjusted by advancing fuel injection timing to increase the engine NOx generation rate.

One having ordinary skill in the art will recognize that the functionality of the real-time SCR simulation model 120, the calculation module 140, the inverse engine NOx generation model 150, and the EGR controller 160 can be implemented in control module 50 in the form of appropriate decision logic and preprogrammed single or multi-variable lookup tables having calibration values determined empirically by monitoring operating parameters of a specific type of engine 10 and aftertreatment system 40 over different operating ranges.

FIG. 3 graphically shows NH3 storage capacity (404) for an NH3-SCR device 44 as a function of its inlet temperature (402). An embodiment of the calculation module 140 is used as a basis for determining the graphically depicted relationships. Depicted NH3 storage capacities include a maximum NH3 storage capacity (430) For the NH3-SCR device, a setpoint NH3 loading (410), and an accompanying preferred NH3 storage trajectory (420), each which varies with the inlet temperature (402) of the NH3-SCR device 44. An NH3 storage model, e.g., as described herein, may be used to estimate the mass of stored NH3 on the NH3-SCR device 44. An exemplary actual NH3 storage trajectory (440) associated with operating conditions is also shown. The exemplary actual NH3 storage trajectory (440) indicates an operating condition associated with a rapid change in the NH-3 SCR device 44 inlet temperature coupled with a low engine NOx generation rate, such as occurs during an engine acceleration event.

The exemplary actual NH3 storage trajectory (440) corresponds to the present NOx generation rate (110) of the engine 10 described herein. The NOx reduction rate (125) of the NH3-SCR device 44 is determined as previously described. During engine operating conditions that result in the exemplary actual NH3 storage trajectory (440), the amount of NH3 consumed in reducing NOx in the exhaust gas feedstream may be insufficient to reduce the NH3 that is stored. Coincidentally, the engine operating conditions may cause the operating inlet temperature of the NH3-SCR device 44 to be reduced Ammonia slip occurs when the temperature of the catalyst in the NH3-SCR device 44 decreases and the amount of NH3 consumed in reducing NOx in the exhaust gas feedstream is insufficient to reduce the stored NH3 in the NH3-SCR device 44. As depicted, ammonia slip may occur when the temperature-based maximum NH3 capacity (430) for the NH3-SCR device 44 decreases at a higher rate than the actual NH3 storage trajectory (440) due to a low NOx rate in the exhaust gas feedstream Ammonia slip is depicted as occurring at point (450).

The estimated mass of stored NH3 on the NH3-SCR device 44 is used to control inflow of NH3 from the exhaust gas feedstream. A control scheme is executed to maintain the estimated mass of stored NH3 at or near the setpoint NH3 loading (410).

The preferred NOx generation rate (145) output from the engine 10 is a NOx generation rate that consumes a sufficient amount of ammonia in the NH3-SCR device 44 to prevent ammonia slip from the NH3-SCR device 44, as previously described.

The control scheme 100 adjusts the engine-out NOx generation rate to achieve the preferred NH3 storage trajectory (420). The engine-out NOx generation rate is adjusted in proportion to a difference between the preferred NH3 storage trajectory (420) and the actual NH3 storage trajectory (440) at the inlet temperature of the NH-3 SCR device 44. In one embodiment, the control scheme 100 controls the EGR valve to manage the engine EGR rate using a preprogrammed table to determine a reduction in the EGR flowrate to increase the NOx generation rate to consume additional stored NH3, thus allowing the preferred NH3 Storage Trajectory (420) to be achieved. In another embodiment, the control scheme 100 controls the EGR valve to manage the engine EGR flowrate by controlling the inlet mass air flowrate using a preprogrammed table to determine an increase in the engine mass airflow rate and corresponding decrease in the engine EGR flowrate to increase the NOx generation rate to consume additional stored NH3, thus allowing the preferred NH3 Storage Trajectory (420) to be achieved.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating an internal combustion engine configured to operate in a compression-ignition combustion mode and including an exhaust aftertreatment system comprising an ammonia-selective catalytic reduction device, the method comprising:
    determining a present engine NOx generation rate;
    determining an actual NOx reduction rate of the ammonia-selective catalytic reduction device;
    determining an ammonia slip rate from the ammonia-selective catalytic reduction device corresponding to the actual NOx reduction rate of the ammonia-selective catalytic reduction device and the present engine NOx generation rate; and
    controlling, by a controller, the engine to adjust the present engine NOx generation rate in response to the ammonia slip rate from the ammonia-selective catalytic reduction device, comprising:
        determining an actual ammonia storage trajectory for the ammonia-selective catalytic reduction device corresponding to the present engine NOx generation rate,
        adjusting the present engine NOx generation rate to achieve a preferred ammonia storage trajectory associated with a setpoint amount of stored ammonia to prevent said ammonia slip, the setpoint amount of stored ammonia determined in relation to an inlet temperature of the ammonia-selective catalytic reduction device,
        employing an inverse engine NOx generation model to determine a fraction of externally recirculated exhaust gas that achieves the adjusted engine NOx generation rate, and
        controlling flow of the externally recirculated exhaust gas to achieve the fraction of externally recirculated exhaust gas that achieves the adjusted engine NOx generation rate.

2. Method for operating an internal combustion engine including an exhaust aftertreatment system comprising an ammonia-selective catalytic reduction device, the method comprising:
    monitoring engine operation;
    determining a present engine NOx generation rate corresponding to the monitored engine operation;
    determining an actual NOx reduction rate of the ammonia-selective catalytic reduction device;
    determining a rate of ammonia slip output from the ammonia-selective catalytic reduction device based upon a difference between the actual NOx reduction rate and the present engine NOx generation rate; and
    adjusting, by a controller, the engine NOx generation rate in response to the rate of ammonia slip output from the ammonia-selective catalytic reduction device, comprising:
        determining an actual ammonia storage trajectory for the ammonia-selective catalytic reduction device corresponding to the present engine NOx generation rate,
        adjusting the present engine NOx generation rate to achieve a preferred ammonia storage trajectory associated with a setpoint amount of stored ammonia to prevent said ammonia slip, the setpoint amount of stored ammonia determined in relation to an inlet temperature of the ammonia-selective catalytic reduction device,
        employing an inverse engine NOx generation model to determine a fraction of externally recirculated exhaust gas that achieves the adjusted engine NOx generation rate, and
        controlling a flowrate of the externally recirculated exhaust gas to achieve the fraction of externally recirculated exhaust gas that achieves the adjusted engine NOx generation rate.

3. Method for operating an internal combustion engine coupled to an exhaust aftertreatment system consisting of a three-way catalytic converter and an ammonia-selective catalytic reduction device, the method comprising:
    determining a NOx reduction rate in the ammonia-selective catalytic reduction device;
    determining an ammonia slip rate from the ammonia-selective catalytic reduction device corresponding to the NOx reduction rate of the ammonia-selective catalytic reduction device; and controlling, by a controller, an engine NOx generation rate in response to the ammonia slip rate from the ammonia-selective catalytic reduction device, comprising:
  determining an actual ammonia storage trajectory for the ammonia-selective catalytic reduction device corresponding to a present engine NOx generation rate,
  adjusting the present engine NOx generation rate to achieve a preferred ammonia storage trajectory associated with a setpoint amount of stored ammonia to prevent said ammonia slip, the setpoint amount of stored ammonia determined in relation to an inlet temperature of the ammonia-selective catalytic reduction device,
  employing an inverse engine NOx generation model to determine a fraction of externally recirculated exhaust gas that achieves the adjusted engine NOx generation rate, and
  controlling flow of the externally recirculated exhaust gas to the engine to achieve the fraction of externally recirculated exhaust gas that achieves the adjusted engine NOx generation rate.

4. The method of claim 1, wherein controlling, by a controller, the engine to adjust the present engine NOx generation rate in response to the ammonia slip rate from the ammonia-selective catalytic reduction device further comprises controlling the flow of externally recirculated exhaust gas to the engine and correspondingly controlling an inlet mass air flowrate to achieve the fraction of externally recirculated exhaust gas that achieves the adjusted engine NOx generation rate.

5. The method of claim 1, wherein controlling, by a controller, the engine to adjust the present engine NOx generation rate in response to the ammonia slip rate from the ammonia-selective catalytic reduction device further comprises advancing fuel injection timing to increase the engine NOx generation rate to achieve the adjusted engine NOx generation rate.

6. The method of claim 2, wherein adjusting, by a controller, the engine NOx generation rate in response to the rate of ammonia slip output from the ammonia-selective catalytic reduction device further comprises controlling the flow of externally recirculated exhaust gas to the engine and correspondingly controlling an inlet mass air flowrate to achieve the fraction of externally recirculated exhaust gas that achieves the adjusted engine NOx generation rate.

7. The method of claim 2, wherein adjusting, by a controller, the engine NOx generation rate in response to the rate of ammonia slip output from the ammonia-selective catalytic reduction device further comprises advancing fuel injection timing to increase the engine NOx generation rate to achieve the adjusted engine NOx generation rate.

8. The method of claim 3, wherein controlling, by a controller, the engine NOx generation rate in response to the ammonia slip rate from the ammonia-selective catalytic reduction device further comprises advancing fuel injection timing to increase the engine NOx generation rate to achieve the adjusted engine NOx generation rate.

9. The method of claim 3, wherein controlling, by a controller, the engine NOx generation rate in response to the ammonia slip rate from the ammonia-selective catalytic reduction device further comprises controlling the flow of externally recirculated exhaust gas to the engine and correspondingly controlling an inlet mass air flowrate to achieve the fraction of externally recirculated exhaust gas that achieves the adjusted engine NOx generation rate.

* * * * *